United States Patent

[11] 3,633,423

| [72] | Inventor | John F. W. Bell |
| | | Glengarth, Causey Hill, Hexham, |
| | | Northumberland, England |
| [21] | Appl. No. | 6,406 |
| [22] | Filed | Jan. 28, 1970 |
| [45] | Patented | Jan. 11, 1972 |
| [32] | Priority | Jan. 29, 1969 |
| [33] | | Great Britain |
| [31] | | 4,934/69 |

[54] ACOUSTIC THERMOMETERS
11 Claims, 4 Drawing Figs.

| [52] | U.S. Cl. | 73/339 A |
| [51] | Int. Cl. | G01k 11/26 |
| [50] | Field of Search | 73/339 A |

[56] References Cited
UNITED STATES PATENTS

| 2,758,663 | 8/1956 | Snavely | 73/339 A UX |
| 3,350,942 | 11/1967 | Peltola | 73/339 A |
| 3,399,570 | 9/1968 | Pirlet | 73/339 A |
| 3,487,690 | 1/1970 | Bell et al. | 73/339 A |

*Primary Examiner*—Louis R. Prince
*Assistant Examiner*—Frederick Shoon
*Attorney*—Oberlin, Maky, Donnelly & Renner ABSTRACT: An acoustic thermometer of the resonant sensor type relies for its operation on variations in the resonant frequency of an acoustic resonator with temperature. Pulses of ultrasound are supplied over an acoustic resonator with temperature. Pulses of ultrasound are supplied over an acoustic transmission line to the acoustic resonator and an automatically operating electronic arrangement varies the frequency of the ultrasound to maintain the acoustic resonator in resonance as the temperature varies. The echo signals returned down the transmission line each include a crossover in their waveform, and the electronic arrangement operates by maintaining the echo signal before crossover precisely in antiphase with the echo signal after crossover.

3,633,423

ACOUSTIC THERMOMETERS

BACKGROUND OF THE INVENTION

Acoustic thermometers have been previously proposed, for example in an article "A solid acoustic thermometer" by J. F. W. Bell in Ultrasonics for Jan. 1968 at pages 11 to 14. All previously proposed acoustic thermometers have however required a human operator in the loop to control the frequency of the ultrasound supplied to the acoustic resonator to maintain it in resonance as the temperature varies.

SUMMARY OF THE INVENTION

One object of the present invention is to provide a new or improved acoustic thermometer.

Another object of the present invention is to provide an acoustic thermometer in which the frequency of the ultrasound is controlled automatically to maintain the acoustic sensor in resonance.

Another object of the present invention is to provide an acoustic thermometer in which the echo signal before crossover is automatically maintained in antiphase with the echo signal after crossover.

According to the present invention an acoustic thermometer comprises an acoustic resonator which during operation is positioned at a location at which the temperature is to be determined, a source of pulses of ultrasound, an acoustic transmission line over which said pulses are transmitted from the source to the acoustic resonator and over which the resulting echo signals are returned, and electronic means automatically to vary the frequency of the ultrasound supplied by the source to maintain the acoustic resonator in resonance as the temperature of the acoustic resonator varies.

The resonant frequency has a fixed relationship with the temperature of the acoustic resonator, and knowledge of the resonant frequency therefore enables the temperature to be determined.

The present invention provides an automatically operating loop and is based on the realization that the echo signals have certain phase amplitude properties associated with the zero amplitude value relative to time or crossover. At resonance the echo signal before crossover is precisely in antiphase with the echo signal after crossover. On moving away from resonance this phase change varies.

The means automatically to vary the frequency of the ultrasound supplied by the source may therefore operate by sensing this phase difference and controlling the frequency of the ultrasound to bring the phase difference to 180°.

The method of doing this may be to derive a reference signal from the ultrasound supplied by said source and compare a few oscillations of this reference signal with a few oscillations of the echo signal before crossover. A few oscillations of the echo signal after crossover are similarly compared with the inverse of the reference signal. This enables voltages proportional to the overlap of the signals to be derived and at resonance these voltages are equal. The difference between these voltages is therefore derived to provide an error signal to control the frequency of the ultrasound supplied by the source.

BRIEF DESCRIPTION OF THE DRAWINGS

An acoustic thermometer in accordance with the present invention will now be described by way of example with reference to the accompanying drawings, in which.

DESCRIPTION OF THE PREFERRED EMBODIMENT

The thermometer to be described is of the resonant sensor type which relies for its operation on variations in the resonant frequency of an acoustic resonator with temperature. The acoustic resonator is supplied with pulses of ultrasound, and resonance is determined by electronic examination of the echo signals returned. This results in the derivation of an error signal which controls the frequency of the ultrasound to maintain resonance with variations in temperature of the acoustic resonator. As the resonant frequency has a fixed relationship with the temperature of the acoustic resonator, knowledge of the resonant frequency enables the temperature to be determined.

To avoid confusion, the actual frequency of the ultrasound will hereinafter be referred to as the carrier frequency, whilst the term pulse frequency will be used to indicate the frequency of the pulses of carrier frequency supplied to the acoustic resonator.

Figure 1:
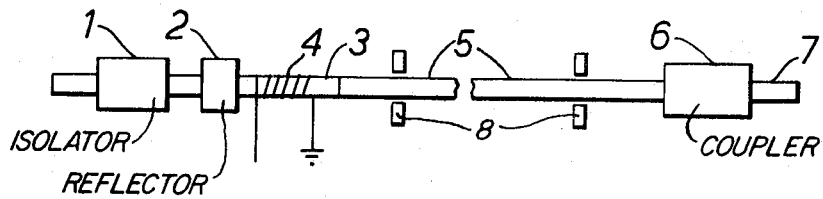
FIG. 1 shows the mechanical parts of the thermometer diagrammatically.

Referring to FIG. 1, the mechanical parts of the thermometer comprise an isolator 1, a reflector 2, a magnetostrictive transducer 3 having a driving coil 4, an acoustic transmission line 5, a coupler 6 and an acoustic resonator 7. The transducer 3 may be made of rod, wire, strip or tube made of a magnetic alloy of equal parts of cobalt and iron, the high curie point of this material making it suitable for use at temperatures of up to 200° to 400° C., which should not normally be exceeded at the 'cold' end of the thermometer.

The isolator 1 and reflector 2 form a termination sufficiently massive to reflect the carrier frequency without change of phase over the frequency range of the thermometer. The driving coil 4 is located half a wavelength at the carrier frequency from the termination, so that the forward and reflected waves reinforce.

The transducer 3 may be silver soldered or welded to the transmission line 5, a good acoustic match being necessary. The transmission line 5 may be some 1 mm. in diameter. Depending on the temperature at which the thermometer is to be used, the transmission line 5 may, for example, be of steel, iron, alumina, molybdenum, graphite or pyrolytic graphite. In many situations mechanical support and location of the transmission line 5 is necessary, and this is done by loosely fitting bearings. To avoid spurious echoes from these bearings, they should be of as low an acoustic impedance as possible. Any welding or sticking couples the transmission line 5 to the bearing and distorts the echo pattern.

The acoustic resonator 7 may comprise a right circular cylindrical body some 10 mm. in length and 2 to 3 'in diameter. Other forms of resonator are however possible, as for example described in the article 'A solid acoustic thermometer' by J. F. W. Bell in Ultrasonics for Jan. 1968 at pages 11 to 14. The acoustic resonator 7 is described by the frequency and the Q factor, which is the sharpness of the resonance. The frequency is proportional to the velocity of sound in the material and is a function of the shape of the acoustic resonator 7. For any resonator there are a large number of resonances, but the lowest modes are well spaced and can be excited separately.

$$Q = (2\pi \times \text{Energy stored})/(\text{Energy lost per cycle})$$

The material of the acoustic resonator 7 is chosen in dependence upon the temperature at which the thermometer is to be used. Possible materials include silver, graphite, ruthenium, rhenium and molybdenum. For high temperatures pyrolytic graphite or tungsten may be used. There is some evidence that a single-crystal resonator is to be preferred, and for this purpose silicon is suitable up to 1,200° C. and sapphire may also be suitable. In a single-crystal resonator hysteresis effects due to polycrystalline growth effects are eliminated.

Figure 4:
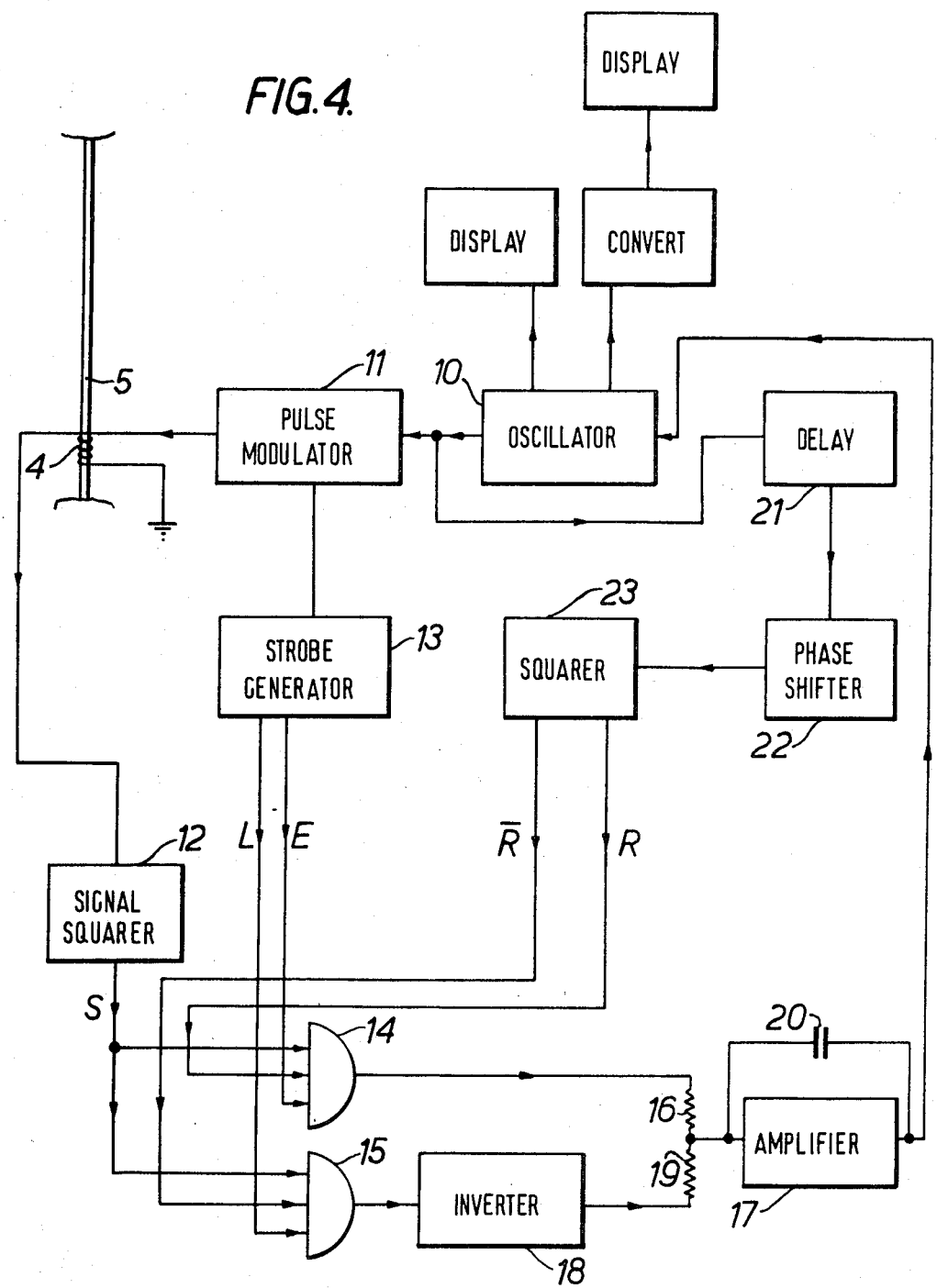
FIG. 4 shows a block schematic diagram of the electronic parts of the thermometer.

Referring now to FIG. 4, the electronic parts of the thermometer comprise an oscillator 10 which generates the carrier frequency and supplies it to a pulse modulator 11. The output of the pulse modulator 11 is supplied to the driving coil 4, and the return echo signals are supplied to a signal squarer 12. The output of the pulse modulator 11 is also supplied to a strobe generator 13.

Two three-input AND-gates 14 and 15 have their outputs connected respectively by way of a resistor 16 to the input of an integrating amplifier 17, and by way of an inverter circuit 18 and a similar resistor 19 to the input of the amplifier 17. Connected across the amplifier is a capacitor 20 and also possibly a resistor (not shown) to provide cycle-to-cycle averaging and to avoid saturation on setting up. The output of the amplifier 17 is connected, if necessary by way of an amplifier (not shown) to the oscillator 10.

The output of the oscillator 10 is also supplied by way of a delay line 21 to a phase shifter 22, the output of which is connected to a squarer 23.

Some of these circuits and devices will now be described in greater detail.

The oscillator 10 is a multivibrator. The output of the multivibrator, which is a square wave, is converted to a triangle waveform as an approximation to a sinusoid. The carrier frequency is controlled by varying the current feeds to the bases of the multivibrator transistors. Two current sources are used, one manually controlled, and the other controlled by the feedback signal supplied from the amplifier 17. Each control is capable of varying the carrier frequency between about 100 and 135 kHz.

The pulse modulator 11 generates a 100 Hz. clock pulse which is synchronized to the carrier frequency. It produces a gate signal which is manually controlled to give a pulse width of 1/10 to 2 milliseconds. The pulse gates the carrier frequency supplied to a power amplifier, the output of which is transformer coupled to the driving coil 4.

The delay line 21 has a delay approximately equal to that in the mechanical part of the acoustic thermometer. The function of the delay line 21 is to equalize the phase shift between the reference signal which is supplied from the oscillator 10 via the delay line 21, and the echo signal which comes back from the acoustic resonator 7 (FIG. 1) as the carrier frequency is changed.

The phase shifter 22 is a manually controlled, direct-current-fed, phase modulator. It is used in setting up the control loop, and in fact the manual control can be arranged to be automatic.

Figure 3:
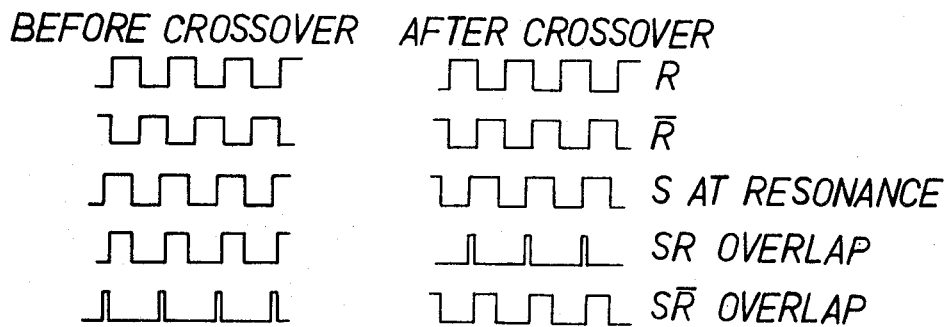
FIG. 3 shows further waveforms referred to in explaining the operation of the thermometer.

The squarer 23 produces synchronous square waves from the carrier frequency. Referring also to FIG. 3, the squarer 23 supplies two outputs, R being the reference signal and $\bar{R}$ being the inverse reference signal. The reference signal and the inverse reference signal are supplied to the gates 14 and 15 respectively. The signal squarer 12 derives a square wave S from the echo signal and supplies this signal S to the gates 14 and 15.

Figure 2:
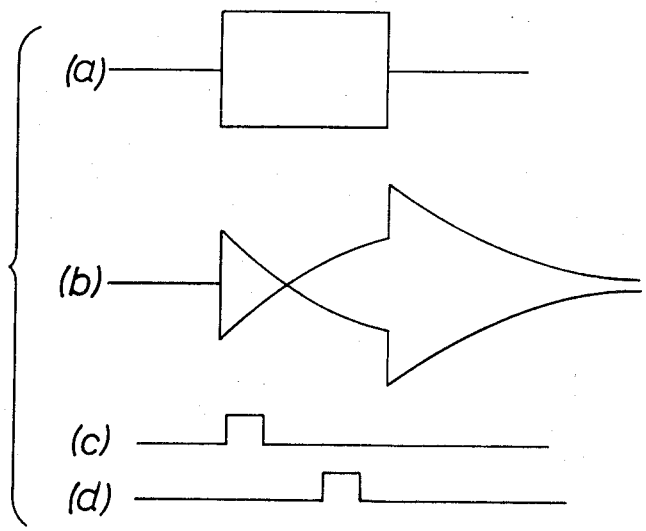
FIG. 2 shows four waveforms referred to in explaining the operation of the thermometer.

The strobe generator 13 is triggered at the pulse frequency. Referring also to FIG. 2, it generates an early gate signal E and late gate signal L, the signals E and L being supplied to the gates 14 and 15 respectively. The time position and width of the signals E and L are manual controlled and each covers five or six oscillations at the carrier frequency before and after the echo crossover.

The gates 14 and 15 therefore cover the overlap of the echo square wave signal S and the reference signals R and $\bar{R}$. In the resonant condition the overlaps will be equal. It is necessary to convert the output pulse width to a signal voltage, and the difference between the early and late signals is then a measure of the departure from the resonant condition. The overlap will vary between about 0 and 5 microseconds.

The principle the measurement is therefore to sample say three to seven cycles of the echo signal before and after crossover and compare the S and R, and S and $\bar{R}$ waveforms in the gates 14 and 15. Only the overlaps reach the outputs of the gates 14 and 15. One of the output signals of the gates 14 and 15 is inverted in polarity and both are clamped to earth, so the amplifier 17 converts the overlap to a direct current level which forms an error signal and which is zeroed about a phase difference of 180°. This error signal is fed back to control the carrier frequency generated by the oscillator 10 in the direction of resonance.

Referring now to FIG. 2, waveform (a) is the envelope waveform of a pulse of carrier oscillations typically 300 microseconds' duration, waveform (b) is the envelope waveform of the echo signal for the resonant condition, showing the crossover, and waveforms (c) and (d) are the signals E and L each sampling about six oscillations.

Referring again to FIGS. 3 and 4, in operation of the thermometer the acoustic resonator 7 (FIG. 1) is positioned at the location where the temperature is to be measured, and pulses of carrier frequency are supplied by the oscillator 10 to the driving coil 4. A few oscillations of the reference signal R are compared with a few oscillations of the echo signal before crossover, and a few oscillations of the echo signal S after crossover are similarly compared with the inverse reference signal $\bar{R}$ in gates 14 and 15 respectively. As described above, this results in an error signal which is fed back by amplifier 17 to the oscillator 10 to vary the carrier frequency in such a way as to maintain resonance.

Because the resonant frequency of the acoustic resonator 7 (FIG. 1) has a fixed relationship with the temperature, knowledge of the carrier frequency enables the temperature to be determined. Referring to FIG. 4, this may be done by displaying the carrier frequency digitally on a display 24 for reading and subsequent conversion to temperature by means of conversion tables. Alternatively, with a thermometer which has been previously calibrated, the carrier frequency may be supplied to an electronic circuit 25 which performs the necessary conversion to temperature, so enabling the temperature to be directly digitally displayed on a display 26.

The electronic loop described controls the carrier frequency generated by the oscillator 10 to a high degree of accuracy. An important effect of this is that it enables the choice of the material for the acoustic resonator 7 (FIG. 1) to be made primarily in dependence on the maximum temperature at the location at which the temperature is to be measured, and on the other physical conditions at that location. The choice is not restricted to materials, such as metals, having a large temperature coefficient.

It should be noted that the thermometer described can readily be adapted for use in controlling temperature. Thus an error signal is always available at the output of the amplifier 17 (FIG. 4) and this error signal can be used for control purposes, for example, for maintaining an electric furnace at a required temperature by controlling the power supply. In such a case the required temperature would first be set manually.

If temperature measurements are required at a plurality of locations then it is necessary to duplicate the mechanical parts of the thermometer described, that is the parts shown in FIG. 1, for each location. It is not however necessary to duplicate the electronic parts, it only being necessary to add a switching arrangement whereby connection is made cyclically or otherwise as required to each driving coil 4. On first having a signal applied to the driving coil 4 there is a short period before conditions settle down, so a delay of say 5 seconds before a reading is made is desirable. If therefore the system is to measure the temperature cyclically at say 12 locations the total cycle time will be 1 minute.

Where the disposition of the various locations is such that transmission lines 5 of different lengths are required, then the arrangement for generating the reference signal must be modified. In place of the delay line 21 and phase shifter 22 a reference signal generator is used which produces a burst of oscillations to coincide with the echo signal. The burst is controlled to start at a preset phase and is triggered by the onset of the returning echo signal. This alternative reference signal generator can of course also be used with a single acoustic resonator arrangement.

Various other modifications can of course be made without departing from the invention as defined by the appended claims.

I claim:

1. An acoustic thermometer comprising an acoustic resonator which during operation is positioned at a location at which the temperature is to be determined, a source of pulses of ultrasound, an acoustic transmission line over which said pulses are transmitted from the source to the acoustic resonator and over which the resulting echo signals are returned, said transmission line being supported in at least one loose bearing having a low acoustic impedance relative to the line impedance, and electronic means automatically to vary the carrier frequency of the ultrasound supplied by the source to maintain the acoustic resonator in resonance as the temperature of the acoustic resonator varies.

2. A thermometer as set forth in claim 1 wherein said electronic means comprises means to derive said echo signals from said transmission line, the waveform of each said echo signal having a crossover at resonance, and means to derive an error signal from said echo signals and to supply said error signal to said source to control the carrier frequency of said ultrasound such that the phases of said echo signals prior to crossover are 180° different from the phases of said echo signals after crossover.

3. A thermometer as set forth in claim 1 wherein said electronic means comprises means to derive said echo signals from said transmission line, the waveform of each said echo signal having a crossover at resonance, means to derive a reference signal from said source, means to compare a few oscillations of each said echo signal before crossover with said reference signal, means to invert said reference signal, means to compare a few oscillations of each said echo signal after crossover with the inverted reference signal, whereby two voltages respectively proportional to the overlap of each echo signal and said reference signal, and the overlap of said echo signal and said inverted reference signal are derived, and means to derive the difference between said two voltages to produce an error signal which is supplied to said source to control the carrier frequency of said ultrasound such that the phases of said echo signals prior to crossover are 180° different from the phases of said echo signals after crossover.

4. A thermometer as set forth in claim 3 wherein said means to compare said oscillations with said reference and inverted reference signals are two AND gates.

5. A thermometer as set forth in claim 3 wherein said means to derive the difference between said voltages to produce an error signal comprises an integrating amplifier.

6. A thermometer as set forth in claim 1 wherein said acoustic transmission line is acoustically coupled at one end to said acoustic resonator and at the other end to a magnetostrictive transducer forming said source and having a driving coil.

7. A thermometer as set forth in claim 6 wherein said magnetostrictive transducer has two ends, one end being acoustically coupled to said acoustic transmission line and the other end being acoustically coupled to an acoustically reflecting termination which is spaced at half a wavelength at the frequency of said ultrasound from said magnetostrictive transducer, so that the forward and reflected waves reinforce.

8. A thermometer as set forth in claim 1 further comprising means digitally to display the frequency of said ultrasound.

9. A thermometer as set forth in claim 1 further comprising a conversion circuit to which a signal of the frequency of said ultrasound is supplied by said source, said circuit supplying an output signal representing the temperature of said acoustic resonator corresponding to said frequency, and display means digitally to display the temperature corresponding to said output signal.

10. A thermometer as set forth in claim 1 wherein said acoustic resonator is acoustically coupled to said acoustic transmission line by way of a coupler.

11. A thermometer as set forth in claim 1 wherein said acoustic resonator is a single crystal.

* * * * *